Jan. 5, 1954 R. M. ORZABAL 2,664,982
COUPLING DEVICE
Filed Oct. 13, 1950 2 Sheets-Sheet 1
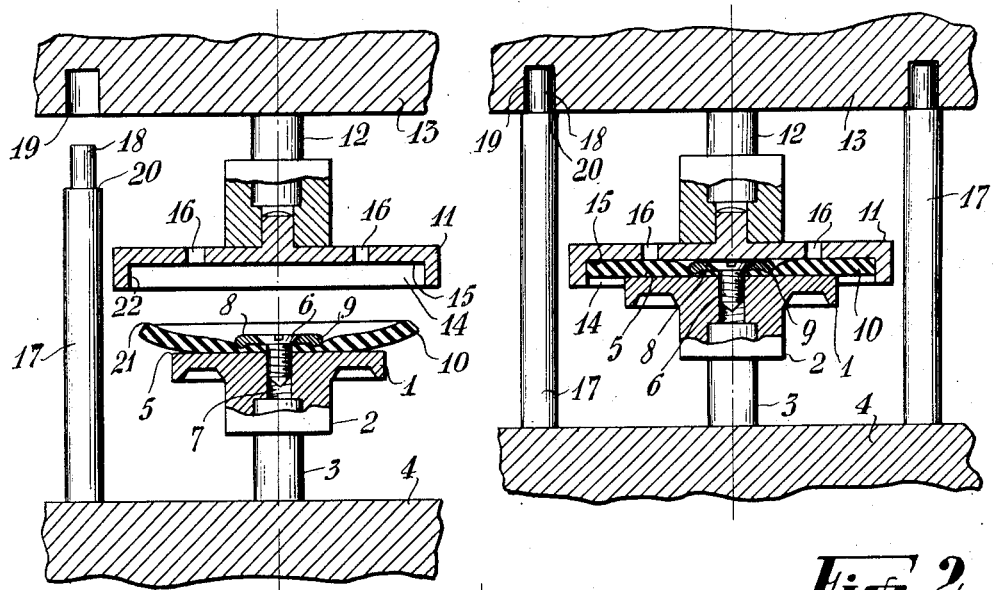
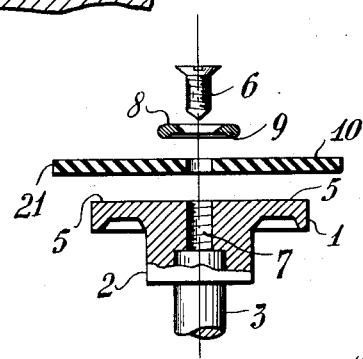
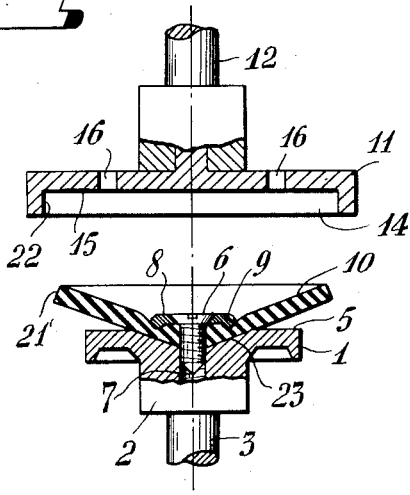
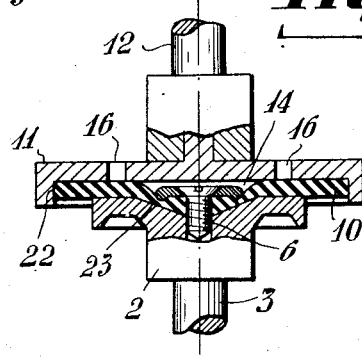
Inventor,
Raul Mariano Orzabal
By Ivan P. Tashof,
Attorney Jan. 5, 1954 R. M. ORZÁBAL 2,664,982
COUPLING DEVICE
Filed Oct. 13, 1950 2 Sheets-Sheet 2
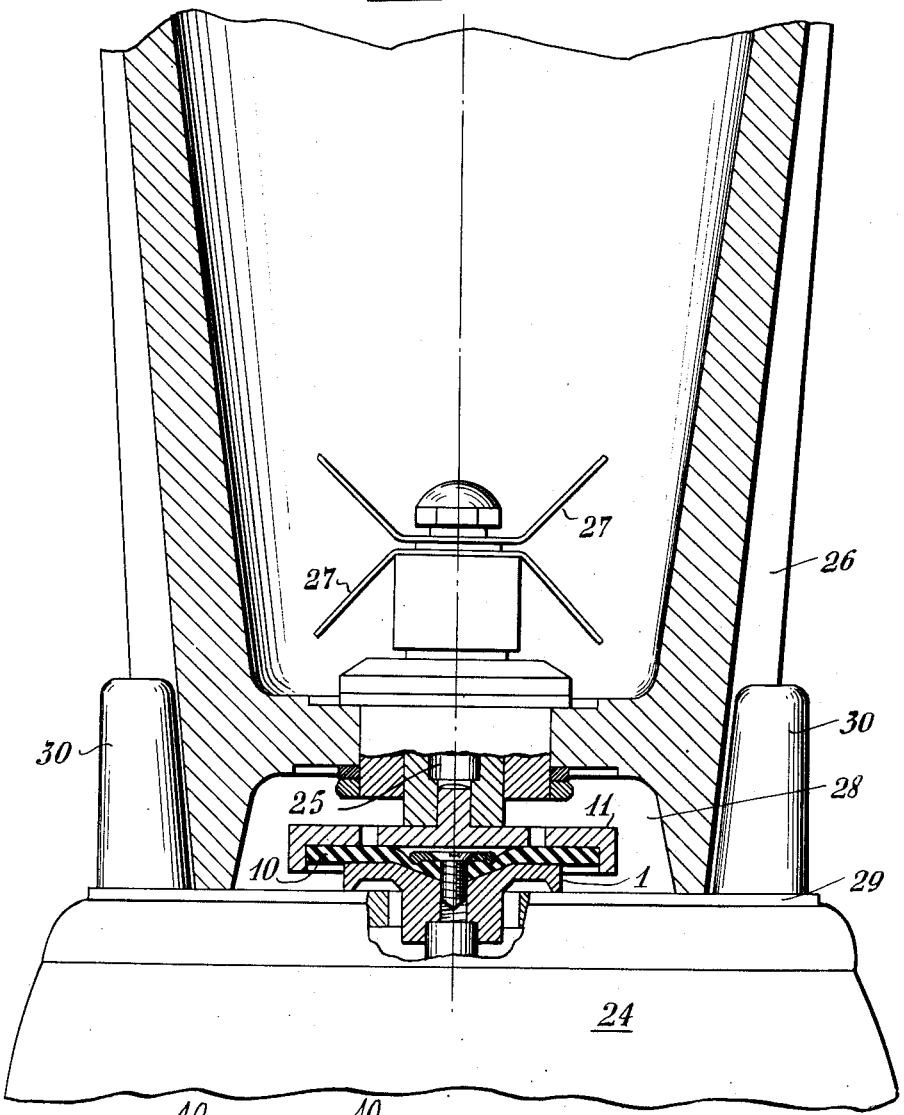
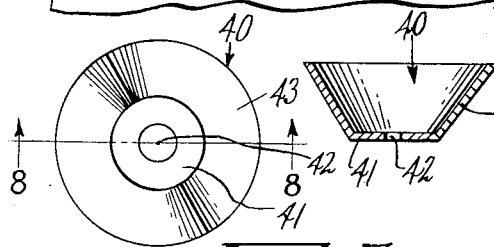
Inventor
Raul Mariano Orzabal
By Ivan P. Tashof,
Attorney Patented Jan. 5, 1954

2,664,982

UNITED STATES PATENT OFFICE 2,664,982

COUPLING DEVICE

Raúl Mariano Orzábal, Buenos Aires, Argentina, assignor to Virason Sociedad de Responsabilidad Limitada, Buenos Aires, Argentina, a corporation of Argentina Application October 13, 1950, Serial No. 189,957

6 Claims. (Cl. 192—105)

This invention refers to a coupling device to be used between a high velocity rotary driving means and a driven device, and more particularly to a coupling device used for driven elements which are detachably related with a driving means, such as the coupling between the receptacles of food mixers and/or disintegrators and the motor mounted in their base.

In most devices utilizing a coupling device of the type referred to, this coupling is of the rigid wedge type in which the driving moment is applied suddenly to the driven device. However, practice has shown that coupling devices of this type, when used in high velocity rotary machines present serious disadvantages which affect the operation of these machines. Taking for instance food mixers and/or disintegrator, it has been observed in practice that, at the instant in which the receptacle of the mixer is seated on the base of the machine, usually there does not exist a perfect alignment between the male and female elements of the coupling and that in most of the cases the male coupling element generally of square cross-section, does not enter perfectly in the cooperating female member of the coupling which usually presents an octogonal cross section. Under such circumstances the user of the mixer, in order to improve the coupling between the receptacle and the motor, turns on the motor but the coupling stud, due to high velocity of the motor, instead of entering completely in the female part of the coupling and taking along the driven receptacle starts rotating alone acting as a cutting tool which, in a short time, destroys nearly completely the coupling of the mixer.

Besides, with a rigid coupling it is necessary to have a perfect alignment between the parts to be coupled and it will be understood that, in domestic appliances, it is sometimes difficult to obtain such perfect alignment due to the treatment to which such machines are subject during their use.

A further of the disadvantages of the known rigid couplings resides in the fact that the same easily transmits the vibrations of the driving means to the driven device.

One of the objects of the present invention consists in providing a coupling device between a high velocity rotary driving means and a driven device wherein the driving moment is applied gradually to the driven device due to the utilization of an elastic coupling element capable of stretching under the influence of the centrifugal force to constitute a friction coupling of gradual action.

A further object of the present invention resides in providing a coupling device of the type referred to which does not require a perfect alignment between the driven and driving element due to the use of a coupling element of elastic material.

A still further object of the present invention consists in providing a coupling device which makes it possible to couple the driven device to the driving motor even when the latter is turning.

Besides, the present invention provides a coupling device between a rotary driving means and a driven device which is free of vibrations and silent in operation.

A still further object of the present invention consists in providing a coupling device between a rotary driving means and a driven device wherein the coupling position does not correspond to a determined number of relative positions between the driving and the driven devices but is obtained in any of the relative positions of the elements to be coupled.

In order to achieve the above objects, the coupling device between a high velocity rotary driving means and a driven device comprises, according to the present invention, a driving plate coupled to the driving means, a coupling disc of larger diameter of rubber or any other elastic material capable of radially expanding under the action of the centrifugal forces acting thereon and concentrically mounted on said driving plate, a driven plate coupled to the driven device and provided with a central circular recess capable of receiving the coupling disc in the coupling position of the device, and means capable of aligning and distancing said plates so that in the coupled position of the coupling device, there is formed between the bottom of the recess of the driven plate and the free surface of the driving plate, a discoidal chamber which laterally is limited by the wall of the recess of the driven plate and which is adapted to receive the coupling disc the outer elastic border of which constitutes a friction coupling in cooperation with the circular wall of said recess.

The invention will now be described more in detail with reference to the accompanying drawings which illustrate two of the preferred embodiments of the coupling device according to the present invention and in which:

Fig. 1 is a longitudinal section of one embodiment of the coupling device according to the invention in the uncoupled position;

Fig. 2 illustrates the coupling device of Fig. 1 in the coupled position;

Fig. 3 is a lateral view, partly in section, of the main elements of the coupling device according to the invention shown in the previous figures;

Figs. 4 and 5 illustrate a second preferred embodiment of the coupling device according to the present invention, in the uncoupled and coupled positions, respectively, and finally Fig. 6 shows a longitudinal section of a food disintegrator provided with a coupling device according to the invention.

Fig. 7 is a top plan view showing the preformed cup-shaped coupling disc;

Fig. 8 is a sectional view taken on the line 8—8 of Fig. 7.

In the figures, equal or similar elements are designated with the same reference numerals.

With reference to Figs. 1, 2 and 3, the coupling device comprises a driving plate 1 fixed by means of a bushing 2 to shaft 3 of the driving means 4, which may be constituted for instance, by a high velocity fractional horsepower electric motor. Plate 1 is provided with a substantially plane upper face 5 to which there is fixed concentrically, by means of a flat head screw 6 screwed in the threaded central bore 7 of plate 1 and by means of a metallic washer 8 provided with a conical central seat for screw 6 and a peripheral border 9, a flat coupling disc 10 of larger diameter of rubber or any other elastic material capable of radially expanding under the action of centrifugal forces.

The coupling device according to the invention comprises further a driven plate 11, fixed to shaft 12 of the driven device 13 (which for instance may be constituted by the set of rotary knives of a food disintegrator or mixer) with a central circular recess 14 having a substantially plane bottom surface 15 and adapted to receive coupling disc 10 in the coupled position of the coupling device. For this purpose the inner diameter of circular recess 14 is slightly larger than the outer diameter of disc 10 in the unstretched position. The bottom of plate 11 is provided with a plurality of perforations 16 the purpose of which will be explained hereinafter.

Finally, the coupling device according to the invention comprises at least two guide columns 17 which, mounted on the driving means 4 penetrate, in the coupled position of the device, by means of their guide pins 18, in bores 19 provided in the driven means 13, the collar seats 20 on these columns 17 determining the exact separation between the plates of the coupling device according to the present invention. These columns thus constitute means for aligning the plates of the coupling device and also means for correctly distancing the bottom 15 of recess 14 of plate 11 with respect to the upper face 5 of plate 1 in order that both plates, in the coupled position, may constitute a discoidal chamber for coupling disc 10 the height of which is slightly larger than the thickness of disc 10.

The coupling device according to the present invention is shown in Fig. 1 in the uncoupled position and it can be easily observed how disc 10, due to the pressure applied to the central portion thereof by the rim 9 of washer 8, acquires a slightly concave shape, so that its outer diameter, which in the plane position of the disc (Fig. 3) is slightly less than the inner diameter of recess 14, is reduced still more, thus facilitating the insertion of the disc into recess 10 when the driven device is coupled to the driving means 4.

When the driven device is mounted by means of guiding pins 18, in such a manner that the coupling device occupies its operative coupled position, that is to say with disc 10 located in the interior of circular recess 14 of plate 11 and when the driving means is put into operation, disc 10 starts radially expanding under the influence of the centrifugal forces acting thereon and on expanding the border 21 of the disc presses with a gradually increasing force against the circular wall 22 of recess 14 thus forming a friction coupling capable of transmitting power to the driven device. This position is illustrated in Fig. 2.

In view of the fact that in the coupling device according to the present invention no metal parts are in contact during the operation of the device, the same is silent and free of vibrations.

Considering that the coupling device according to the present invention is used with driving means of high velocity of rotation, the coupling action between the driving means and the driven device, in spite of being gradual, is nevertheless instantaneous in practice since the radial expansion of disc 10 is obtained in a very short time due to the high velocity of rotation.

On the other hand, in view of the fact that the coupling device according to the present invention comprises a rubber coupling disc 10 which, in the position of coupling, is enclosed in a discoidal chamber limited by face 5 of plate 1 and by bottom 15 of plate 11, said disc, on expanding under the action of the centrifugal forces acting thereon, is capable of exercising with its border 21 a considerable pressure on lateral wall 22 of circular recess 14, since to a certain extent the discoidal chamber formed between the two plates of the coupling device, prevents practically any other displacement of the disc which is not radial.

In order to increase the friction between the border 21 of coupling disc 10 and lateral wall 22 of circular recess 14 of the driven plate, said lateral wall 22 may present a roughened surface.

In the operative position of the coupling device according to the present invention, the coupling disc 10, due to the slightly concave shape thereof, presses lightly against the flat bottom 15 of circular recess 14 and, on establishing a firm contact with the lateral wall 22 of the same recess, acts as a cupping glass with respect to plate 11, affecting the coupling and decoupling of the device. Therefore, the bottom of plate 11 is provided with a plurality of bores 16 which constitute air vents with respect to the discoidal chamber formed during the coupled position of the coupling device.

The coupling device shown in Figs. 4 and 5 differs from that illustrated in the previous figures in that the upper face 5 of driving plate 1 is provided with a central conical seat for coupling disc 10, the construction of the coupling device being otherwise equal to that previously described. Due to the conical seat 23, coupling disc 10, on being fixed to the driving plate 1 by means of washer 8 and screw 6, acquires a slightly more concave shape than disc 10 illustrated in the coupling device shown in Figs. 1, 2 and 3, as can be easily observed in Fig. 4. As consequence thereof the outer diameter of coupling disc 10 when mounted on driving plate 1, decreases in a more pronounced manner with respect to its diameter in the unmounted position, and this facilitates the introduction of the coupling disc 10 in the circular recess 14 of driven plate 11 during the first instances when both plates are approximated to establish a coupling between the driving means and the driven device. The concave shape of coupling disc 10 facilitates also the radial expansion of the disc under the influence of the centrifugal forces acting thereon. Fig. 5 illustrates the modified coupling device in the uncoupled position.

Fig. 6 is a lateral view, partly in section, of a food disintegrator showing the manner in which the coupling device according to the present invention is used in an appliance of this type. In the embodiment shown, the coupling device is of the type illustrated in Figs. 4 and 5, with the driving plate 1 fixed to the shaft 3 of the motor (not shown in the drawing) mounted in the base 24 of the disintegrator, while the driven plate 11 is fixed to a shaft 25 which, passing through the bottom of receptacle 26, is provided with a set of rotary knives 27.

The bottom of receptacle 26 is provided with a central recess 28 and the flange which surrounds driven plate 11 has such a height that when receptacle 26 is seated on seat 29 of base 24 both plates 1 and 11 are separated in the desired manner, i. e. that coupling disc 10 is not compressed therebetween. Seat 29 of base 24 is provided with a plurality of rubber lugs 30 which, on penetrating into the corresponding grooves of receptacle 26 constitute the centering means for the coupling device of the food disintegrator.

In view of the constructive features of the coupling device according to the present invention, the receptacle of the food disintegrator may be placed on the base 24 with the driving plate 1 already turning without causing a destruction of the coupling device in contradistinction to what happens with the known coupling devices. Nevertheless, it is advisable to place first receptacle 26 on base 24 and only then turn on the motor of the food disintegrator.

In the embodiments of the coupling device illustrated in the drawings coupling disc 10 is constituted by a flat disc of rubber or any other suitable material which, either due the action of the fixing means (washer 8 and screw 6) or in combination with a specially formed seat on the driving plate to which it is fixed (conical seat 23) acquires a more or less pronounced concave or cup-shaped configuration with the elevated border thereof looking toward the driven plate. However, it will be understood that in the coupling device according to the invention the coupling disc 10 may be fixed to the driving plate without affecting its shape, so that the disc lies flat on the upper surface of the driving plate. Evidently, in case of using a flat coupling disc, the diameter thereof will have to be slightly less than the diameter of the circular recess 14 of driven plate 11 and the difference in diameters can be easily determined experimentally, since if the flat coupling disc is elastic enough to stretch itself under the influence of the centrifugal forces acting thereon in the operative position of coupling, the outer border of the disc will press against the lateral wall of circular recess 14 and will establish thus a friction coupling between the driving and the driven plates.

On the other hand, it will also be understood that the coupling device according to the present invention may be also used with a preformed cup-shaped elastic coupling disc adequately mounted on the driving plate. In Figs. 7 and 8 there is shown a preformed cup-shaped elastic coupling disc which is designated generally by the numeral 40, and the coupling disc 40 may include a flat portion 41 provided with a central opening 42. A suitable securing element, such as screw 6, may be extended through the opening 42 for maintaining the disc 40 in its proper place. The disc 40 also includes a flaring side wall 43.

It will also be understood that, instead of using a thick-rimmed washer and screw for fixing the coupling disc 10 to the driving plate 1, any other suitable means can be used for this purpose as long as these means are able to forestall a relative rotation of the disc with respect to the driving plate to which it is fixed and do not affect the lateral stretching of the disc under the influence of the centrifugal forces acting thereon during rotation of the plates. For instance it is possible to bond the central portion of the rubber disc 10 directly to the metallic surface of driving plate 1, which could be constructed so as to be replaceable as a unit. It is also possible to use a substantially flat washer instead of the thick-rimmed one shown in the drawings.

It is evident that other modifications can be made in the coupling device according to the invention without departing from the scope of the appended claims.

What I claim is:

1. A coupling device between a high velocity rotary driving means and a driven device, which comprises a driving plate coupled to said driving means and having a substantially flat face and provided with an axial threaded bore, a flat coupling disc of larger diameter of elastic material provided with a central opening and capable of radially expanding under the influence of centrifugal forces acting thereon, a washer provided with a thickened rim and a conical central seat and a flat head screw to press the central portion of said coupling disc against the flat face of said driving plate to give said coupling disc a slightly concave shape and to prevent relative rotational displacements between said coupling disc and said driving plate, a driven plate coupled to said driven device and provided with a central circular flat-bottomed recess the diameter of which is slightly larger than the outer diameter of said concave-shaped coupling disc in the unstretched position, a plurality of perforations provided in the bottom of said recess, means to align said driving and said driven plates and means to vary the elevation of the bottom of said circular recess with respect to the free surface of said coupling disc to constitute, in the coupled position of the coupling device, a discoidal chamber the height of which is slightly larger than the thickness of said coupling disc, the border of said coupling disc constituting during rotation, a friction coupling in cooperation with the lateral wall of said circular recess.

2. A coupling device between a high velocity rotary driving means and a driven device, which comprises a driving plate coupled to said driving means and having a substantially flat face, a preformed cup-shaped coupling disc of larger diameter of elastic material capable of expanding under the influence of centrifugal forces acting thereon, means to attach said cup-shaped coupling disc to the flat surface of said driving plate to prevent relative rotational displacement between said coupling disc and said driving plate, a driven plate coupled to said driven device and provided with a central circular flat-bottomed recess the diameter of which is slightly larger than the outer diameter of said concave-shaped coupling disc in the unexpanded position, means to align said driving and said driven plates and means to vary the elevation of the bottom of said circular recess with respect to the free surface of said coupling disc to constitute, in the coupled position of the coupling device, a discoidal chamber the height of which is slightly larger than the thickness of said coupling disc the border of which constitutes, during rotation, a friction coupling in cooperation with the lateral wall of said circular recess.

3. A coupling device between a high velocity rotary driving means and a driven device, which comprises a driving plate coupled to said driving means and provided with a substantially flat face and a threaded axial bore surrounded by a conical seat, a flat rubber coupling disc of larger diameter provided with a central opening, a washer provided with a thickened rim and a central conical seat and a flat head screw to press the central portion of said coupling disc into said conical seat of said driving plate to give said rubber disc a cup-shaped configuration and to prevent relative rotational displacement between said coupling disc and said driving plate, a substantially flat driven plate provided with a peripheral circular collar the inner diameter of which is slightly larger than the outer diameter of said cup-shaped coupling disc in the unstretched position thereof, a plurality of perforations provided in said driven plate, means to align said driving and said driven plates and means to vary the elevation of the flat face of said driven plate with respect to the free surface of said coupling disc to constitute, in the coupling position of the coupling device, a discoidal chamber the height of which is slightly larger than the thickness of said coupling disc, the border of which constitutes, during rotation, a friction coupling in cooperation with said peripheral circular collar.

4. A coupling device between a high velocity rotary driving means and a driven device, which comprises a flat circular driving plate coupled to said driving means and provided with an axial threaded bore, a flat rubber coupling disc of larger diameter provided with a central opening, a washer provided with a thickened rim and a conical central seat and a flat head screw to press the central portion of said coupling disc against the face of said driving plate to prevent rotational displacement of said disc with respect to said driving plate, a substantially flat driven plate coupled to said driven device and provided with a peripheral circular collar the inner diameter of which is slightly larger than the diameter of said coupling disc in an unstretched position, a plurality of perforations provided in said driven plate, at least two guide bores provided in said driven device, and two cooperating guide pins provided with seats to align said driving and said driven plates and to vary the elevation of the flat face of said driven plate with respect to the free surface of said coupling disc to constitute, in the coupled position of the coupling device, a discoidal chamber the height of which is slightly larger than the thickness of said coupling disc the circular border of which constitutes, during rotation, a friction coupling in cooperation with the inner wall of said peripheral collar.

5. A coupling device comprising a driving plate coupled to a motor shaft and provided with an axial threaded bore, a rubber coupling disc provided with a central opening, an annular member provided with a thickened rim and a conical central seat, a securing element for pressing the central portion of said coupling disc against the face of said driving plate to prevent rotational displacement of said disc with respect to said driving plate, a substantially flat driven plate coupled to the shaft and provided with a collar, the inner diameter of which is slightly larger than the diameter of said coupling disc in an unstretched position, there being a plurality of perforations in said driven plate, and guide pins provided with seats to align said driving and driven plates and to vary the elevation of the flat face of said driven plate with respect to the free surface of said coupling disc to constitute, in the coupled position of the coupling device, a discoidal chamber the height of which is slightly larger than the thickness of said coupling disc, the border of said coupling disc constituting during rotation, a friction coupling in cooperation with the lateral wall of said circular recess.

6. A coupling device comprising a driving plate coupled to a motor shaft and provided with a bore, a coupling disc provided with a central opening, an annular member provided with a thickened rim and a central seat, a securing element for pressing the central portion of said coupling disc against the face of said driving plate to prevent rotation or displacement of said disc with respect to said driving plate, a driven plate provided with a collar, the inner diameter of which is slightly larger than the diameter of said coupling disc in an unstretched position, there being a plurality of perforations in said driven plate, and guide pins provided with seats to align said driving and driven plates and to vary the elevation of the flat face of said driven plate with respect to the free surface of said coupling disc to constitute, in the coupled position of the coupling device, a discoidal chamber the height of which is slightly larger than the thickness of said coupling disc, the border of said coupling disc constituting during rotation, a friction coupling in cooperation with the lateral wall of said circular recess.

RAÚL MARIANO ORZÁBAL.

References Cited in the file of this patent

UNITED STATES PATENTS

| Number | Name | Date |
|---|---|---|
| 2,233,705 | Hook | Mar. 4, 1941 |
| 2,260,770 | Brownlee | Oct. 28, 1941 |
| 2,304,476 | Poplawski | Dec. 8, 1942 |
| 2,511,357 | Marty | June 13, 1950 |

FOREIGN PATENTS

| Number | Country | Date |
|---|---|---|
| 343,823 | Italy | of 1937 |
| 255,051 | Switzerland | Jan. 3, 1949 |